INVENTOR.
JOHN W. MOBARRY
BY
ATTORNEY

United States Patent Office 3,127,754
Patented Apr. 7, 1964

3,127,754
REFRIGERATION CONTROL APPARATUS WITH TIME DELAY MEANS
John W. Mobarry, Minneapolis, Minn., assignor to Minneapolis-Honeywell Regulator Company, Minneapolis, Minn., a corporation of Delaware
Filed Oct. 4, 1962, Ser. No. 228,483
4 Claims. (Cl. 62—158)

The present invention is concerned with an improved refrigeration control system; in particular, the invention is concerned with a delay in the operation of certain components in a refrigeration system to prevent short cycling of the motor compressor upon intermittent opening and closing operations of a space thermostat.

In control systems for refrigeration apparatus, the industry has recognized the need for means to prevent rapid starting and stopping or short cycling of a refrigeration compressor. Where a thermostat directly controls a refrigeration system, any type of thermostat jiggling to rapidly start and stop the compressor can cause abnormal results on the motor compressor. Under such conditions, the input current to the motor is excessive for a longer than normal period of time as well as the fact that once the compressor is in operation and stopped for a short period and allowed to restart, the compressor normally would start under heavy load conditions causing undue strain on the compressor. Such is especially true if the refrigeration system is such that the head pressure does not have a chance to drain off during the off period.

The invention has become important in modern air conditioning equipment which uses low starting torque compressor motors and capillary tubes for the pressure dropping means. If an attempt to restart the compressor is made too soon after the previous shut-off, system pressure will not have equalized and the motor will stall. Without the minimum "recycle" time provided by this disclosure, the compressor motor locked rotor protection means may be called upon to function too frequently and thus limit the useful and safe life of the system.

The applicant recognizes that to interpose a timer between the thermostat and the compressor to prevent the operation of the compressor in an off and on manner when the circuit of the thermostat is open and closed rapidly is broadly old. Presently, a mechanical switch timer means is on the market for broadly accomplishing what the applicant does.

In an effort to make such a system more reliable and simple, as well as less expensive, the applicant invented the present invention which has proven to be more superior than other systems.

An object of the present invention is to provide an improved system wherein the thermostat is connected to a compressor through a timing apparatus comprising two time delay portions to prevent intermittent operation of the compressor upon rapid interruptions of the thermostat circuit.

Another object of the present invention is to provide an improved control system for a refrigeration apparatus to prevent short cycling wherein the thermostat is connected to the compressor through two time delay means such that a first time delay means interposes a short delay in the operation of the compressor after the thermostat closes and a second delay means interposes a longer delay after the compressor is de-energized by the opening of the thermostat before another operation can occur.

These and other objects of the present invention will become apparent upon the study of the following specification and drawing of which:

Figure 1:
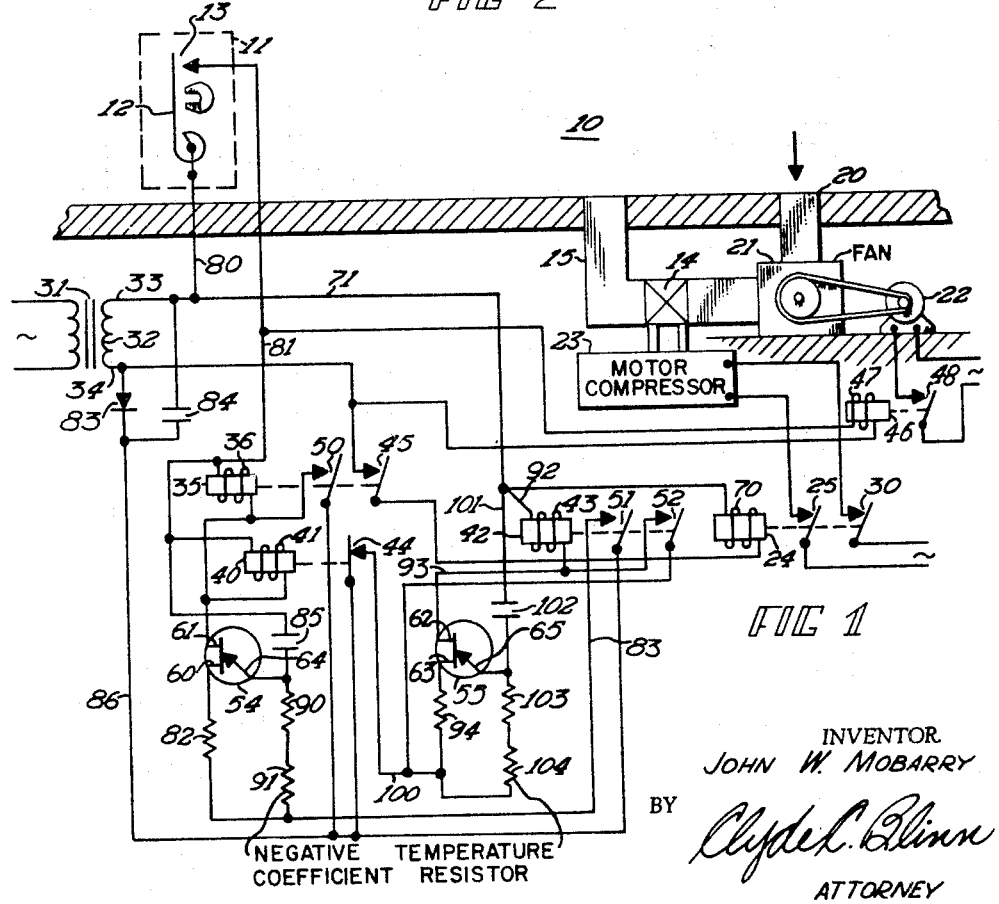
FIGURE 1 is a schematic representation of the control system as applied to a single motor compressor installation for providing cooling to a space containing a space thermostat which is connected to the motor compressor through a delay means.

Referring to FIGURE 1, space 10 comprises a conventional thermostat 11 having a bimetal 12 which operates a switch 13 in a conventional manner. Upon an increase in the space temperature above a predetermined value, switch 13 closes in a snap acting manner, and as the thermostat is satisfied, the switch opens. The air temperature of space 10 is maintained by conditioning the air upon passing the air through a heat exchanger or coil 14 which is connected in a duct network. Air is supplied to the space through duct 15 after being pulled from the space through duct 20 which is connected to a conventional fan 21 driven by a motor 22.

Coil 14 is connected to a motor compressor 23 to make up a conventional refrigeration system as shown in the A. B. Newton Patent 2,214,700. Upon the energization of relay 24, switches 25 and 30 are closed to connect the compressor to a source of power.

A source of power or step-down transformer 31 has a secondary 32 with upper and lower output terminals 33 and 34, respectively. A control relay 35 has an energization winding 36. A holding relay 40 has an energization winding 41. Relays 35 and 40 might be combined but to eliminate the number of switches on each relay, two were used. Another relay 42 has an energization winding 43. Relay 40 has a normally closed switch 44. Relay 35 has two normally open switches 45 and 50. Relay 42 has two normally open switches 51 and 52. A relay 46 has an energization winding 47 and a normally open switch 48. Switch 48 is connected in the power circuit for fan motor 22 to energize fan 21 when relay 46 is energized. Relay winding 47 is connected to secondary power source 32 through thermostat switch 13.

A pair of conventional unijunction transistors 54 and 55 have two base electrodes 60 and 61 and 62 and 63, respectively. The transistors are controlled by a control signal placed on emitter electrodes 64 and 65, respectively. When the thermostat closes, relays 35 and 40 are energized after a short time delay.

When switch 13 closes, a voltage dividing circuit is established for the control of unijunctional transistor 54. The circuit is traced as follows: from terminal 33, a conductor 80, switch 13, a conductor 81, a condenser 85, a conductor 90, a conductor 91, switch 51, a conductor 86, and back to the other side of source of power 34 through a unijunctional current conducting device or diode 83. Connected between conductor 86 and terminal 33 is a condenser for smoothing the output of the diode 83. As the current flows through this path, condenser 85 charges and the voltage at the control electrode 64 which is connected between condenser 85 and resistor 90 increases. By the proper design of the circuit components such as the value of bias current through a resistance 82 which is connected between electrode 60 and conductor 83, transistor 54 will fire to "dump" the current of condenser 85 into the load which is connected between the base electrodes 60 and 61. The load in this particular case is the energization windings 35 and 41 which are connected in parallel and in a circuit traced as follows: from terminal 33, switch 13, conductor 81, a parallel circuit of the energization windings, base electrode 61, base electrode 60, resistor 82, switch 51 and back to the other side of the source of power 34 through diode 83. When the current of condenser 85 is dumped into the windings 36 and 41, the relays are energized and the associated contacts operate. Switch 50 of relay 35 establishes a holding circuit to connect the energization windings 36 and 41 directly to the source of power to bypass transistor 54. In other words, transistor 54 performs a function similar to a thyratron in that once a certain voltage is available on the control electrode 64, the transistor allows the current stored in condenser 85 to be switched into the energization windings of relays 35 and 40. The release of this current provides a pulse which is of sufficient magnitude to energize the relays. By use of a negative temperature coefficient resistor 91 in the voltage dividing circuit, the firing of unijunctional transistor 54 is compensated so changes at ambient temperature have no effect upon the firing voltage necessary.

At the same time switch 13 closes to initiate the charging of condenser 85, relay 46 is immediately energized to start the operation of the fan. Due to the time delay interposed by the time necessary to charge condenser 85, the energization of relay 35 which closes switch 45 to energize the contactor or relay 24 of the compressor is delayed depending upon the circuit components in the voltage dividing circuit. Relay 24 which has an energization winding 70 is connected to be controlled by thermostat 11 through the circuit traced as follows: from terminal 33 of the secondary, a conductor 71, a winding 70, switch 45 and back to the other side 34 of source of power 31. This delay prevents the simultaneous energization of the fan motor 22 and the motor compressor 23 to stagger the motor starting load on the power line.

The second unijunctional transistor 55 has a similar voltage dividing circuit connected to secondary 35 traced as follows: from terminal 33, conductor 71, a conductor 101, a condenser 102, a resistor 103, a negative temperature coefficient resistor 104, a conductor 100, switch 44, and back to the other side of source of power through diode 83. When switch 44 is closed, condenser 102 charges to increase the voltage on control electrode 65 which is connected between condenser 102 and resistor 103. When the voltage reaches some predetermined value, unijunctional transistor 55 fires to "dump" the current of condenser 102 into the energization winding 43 of relay 42 which is connected to transistor 55 by a circuit traced as follows: from terminal 33, conductor 71, conductor 92, winding 43, conductor 93, base electrode 62, base electrode 63, a resistor 94, switch 44 and back to the other side of source of power through diode 83. The negative temperature coefficient resistor 104 accomplishes the same purpose as resistor 91 to make the operation of unijunctional transistor 55 insensitive to changes in ambient temperature. A similar bias adjustment for transistor 55 is made by the selection of resistance 94 which is connected between electrode 63 and conductor 100. Upon the energization of relay 42, a holding circuit is established and traced as follows: winding 43, switch 52, conductor 100 and back to the other side of the source of power.

*Operation*

Figure 2:
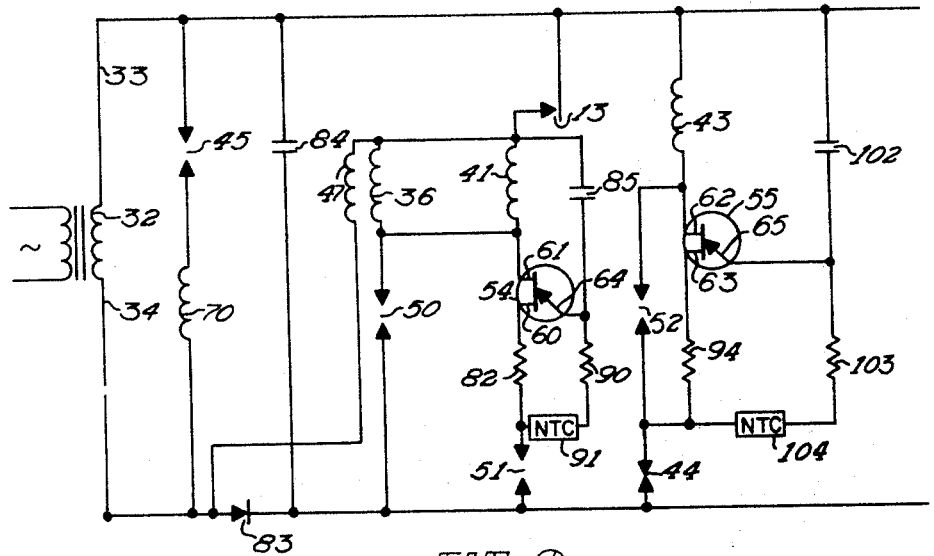
FIGURE 2 is a circuit diagram of the circuit of FIGURE 1 in a more conventional circuit disclosure.

The operation of the present invention will be described by referring to both FIGURE 1 and FIGURE 2. FIGURE 2 is a more conventional manner of disclosing the circuit and the identification numbers of FIGURE 2 correspond with the identification numbers used in FIGURE 1.

Upon energization of secondary power source 32, a voltage is applied to unijunction transistor 55 to result in the energization of the control circuit. After a predetermined "recycle" time delay such as 3 to 5 minutes as determined by the values of condenser 102 and resistors 103 and 104 in the control circuit, transistor 55 will become conductive to bring about the energization of relay 42. By means of negative temperature coefficient resistance 104, the effect of changes of ambient air temperature on the control voltage of transistor 55 is overcome and the time delay is maintained constant. When relay 42 is energized, a holding circuit is established through switch 52 to maintain the relay energized until switch 44 is opened. Upon a need for cooling, thermostat 11 will sense the increase in space temperature to close switch 13. An energization circuit for relays 35 and 40 is made through the unijunction transistor 54. As the voltage on emitter 64 builds up through the time delay circuit including condenser 85 and resistors 90 and 91, transistor 54 will become conductive in a period of 9 to 15 seconds as determined by the value of the components in the control circuit to energize the mentioned relays. This "turn on" time delay prevents the simultaneous energization of the fan motor and the compressor which would place a high surge demand on the power lines. The negative temperature coefficient resistor 91 overcomes the effect of changes of ambient temperature on the control point of transistor 54. The energization of the transistor 54 takes place through the switch 51 which was previously closed by the earlier energization of relay 42. A holding circuit for relays 35 and 40 is established through switch 50 when relay 35 is energized. During the normal operation of the motor compressor, thermostat 11 will remain closed and relays 35 and 40 will be energized. At the same time that relays 35 and 40 are energized, contact 44 opens to de-energize relay 42 as long as motor compressor relay 24 is energized and the compressor is in operation.

When thermostat 11 is satisfied, switch 13 opens to de-energize relays 35 and 40 and switch 44 then closes. As switch 44 is in the energization circuit of the timing circuit including transistor 55, after the predetermined "recycle time" delay, relay 42 will again be energized. Until relay 42 is energized, the timing circuit including transistor 54 cannot be again energized to bring about the operation of relay 24 and the motor compressor. The length of time required for relay 42 to be energized determines the shut down time imposed upon the thermostat even though the thermostat should call for cooling subsequent to the opening of switch 13. During the normal operation of the circuit, the time delay has relatively little function; however, let us assume that thermostat switch 13 is opened and closed quite rapidly. During the normal operation with relays 35 and 40 energized and relay 42 de-energized, a short opening of switch 13 would result in the de-energization of relays 35 and 40 to start the time delay operation of transistor 55. As soon as the holding circuit including switch 50 is open, relays 35 and 40 cannot be normally energized by the subsequent closing of switch 13. The subsequent closing of switch 13 would bring about the starting of the time delay operation to energize relay 42. As soon as relay 42 is energized, relays 35 and 40 can be again energized through the switch 51.

The advantage of this circuit becomes quite important upon thermostat jiggling whether it takes place by the slamming of a door or the switch operation due to children playing with the thermostat. By interposing the time delay in the operation of relays 35 and 40 and the time delay in the operation of relay 42, a safe control system is provided for connecting the thermostat 11 to control the motor compressor.

While the present invention has been described in one particular manner, the intention is to limit the scope of the invention only by the appended claims in which

I claim:

1. In a control system for a refrigeration system to prevent short cycling of a motor compressor, a thermostatic switch in a space in which the temperature is being controlled, a motor compressor refrigeration apparatus for cooling the space, a source of power, a fan motor connected to be controlled by the thermostat, and a timing means connecting said motor compressor through said switch to said source for providing a delay in the operation of said motor after said switch is closed and after the termination of an operation when said switch is open before a subsequent operation can take place upon the closing of said switch, said timing means comprising:

a first unijunctional transistor having two base electrodes and an emitter electrode, a control relay adapted to control said motor compressor having an energization winding and having a normally open switch, a holding relay having an energization winding and a normally closed switch, a second unijunctional transistor having two base electrodes and an emitter electrode, a second relay having an energization winding and two normally open switches, circuit means connecting said energization winding of said control relay and said holding relay in parallel to said source of power through said thermostat and a circuit of said base electrodes of said first transistor and one of said normally open switches of said second relay, circuit means connecting said normally open switch of said control relay to said parallel windings and said source to bypass said first transistor and said one switch, a control circuit for said first transistor including a negative temperature coefficient resistor voltage charging circuit connected to said emitter to cause said first transistor to fire after a predetermined period of time after said thermostat closes, said negative temperature coefficient resistor compensating for any effect of changes in ambient temperature on said first transistor, circuit means connecting said energizing winding of said second relay to said source through a circuit of said base electrodes of said second transistor and said switch of said holding relay, a second control circuit for said second transistor including a negative temperature coefficient resistor voltage charging circuit connected to said emitter to cause said transistor to fire after a predetermined period of time after said switch of said holding relays closes, said negative temperature coefficient resistor compensating for any effect of changes in ambient temperature on said second transistor, and circuit means connecting a second switch of said relay in parallel with said base electrode of said second transistor to maintain said second relay energized.

2. In a control system for a refrigeration system to prevent short cycling of a motor compressor, a thermostatic switch in a space in which the temperature is being controlled, a motor compressor refrigeration apparatus for cooling the space, a source of power, a timing means connecting said motor compressor through said switch to said source for providing a delay in the operation of said motor after said switch is closed and a longer delay after said switch opens before a subsequent operation can take place upon the closing of said switch, said timing means comprising: a first unijunctional transistor having two base electrodes and an emitter electrode, a first relay means adapted to control said motor compressor having an energization winding and a plurality of switch means operated thereby, a second unijunctional transistor having two base electrodes and an emitter electrode, a second relay means having an energization winding and two normally open switches, circuit means connecting said energization winding of said first relay means to said source of power through said thermostat and a circuit of said base electrodes of said first transistor and one of said normally open switches of said second relay, a holding circuit for said first relay means, a control circuit for said first transistor connected to said emitter to cause said first transistor to become conductive after a first predetermined period of time after said thermostat closes, circuit means connecting said energizing winding of said second relay to said source through a circuit of said base electrodes of said second transistor and another of said plurality of switches, a second control circuit for said second transistor connected to said emitter to cause said transistor to become conductive after a second predetermined period, and a holding circuit means connecting a second switch of said second relay in parallel with said base electrodes of said second transistor to maintain said second relay energized.

3. In a control system for a refrigeration system to prevent simultaneous energization of a compressor motor and a fan motor, a thermostatic switch in a space in which the temperature is being controlled, a motor compressor refrigeration apparatus for cooling the space having a fan motor for delivering cool air from the said refrigeration apparatus to said space, a source of power, a timing means connecting said motor compressor through said thermostatic switch to said source of power for providing a delay in the operation of said motor compressor, circuit means connecting said fan motor through said thermostatic switch to said source whereby upon the closure of said thermostatic switch, said fan motor is first energized, said timing means comprising, a transistor having base electrodes and a control electrode, first relay means adapted to control said motor compressor having an energization winding, circuit means connecting said energization winding to said source of power through said thermostatic switch and the circuit of said base electrodes of said transistor, a holding circuit for said first relay means comprising a circuit to maintain said relay energized after being first energized through said transistor, and a control circuit for said transistor connected to said control electrode and being energized by said source when said thermostatic switch closes comprising, a negative coefficient resistor voltage charging circuit for providing a predetermined voltage at said control electrode after a selected energization time, said negative coefficient resistor providing for a change in the charging circuit as the temperature changes to maintain a predetermined time delay in the energization of said transistor regardless of the effect of any changes in the ambient temperature on said transistor.

4. In a control system for a refrigeration system to prevent simultaneous energization of a compressor motor and a fan motor, a space temperature responsive switch in a space in which the temperature is being controlled, a motor compressor refrigeration apparatus, a fan motor for delivering cool air from the said refrigeration apparatus to said space, a source of power, a timing means connecting said motor compressor through said space temperature responsive switch to said source of power for providing a delay in the operation of said motor compressor, circuit means connecting said fan motor through said switch to said source whereby upon the closure of said space switch, said fan motor is first energized and then said motor compressor is energized, said timing means comprising a unijunctional transistor having two base electrodes and an emitter electrode, first relay means adapted to control said motor compressor, said relay means having an energization winding, circuit means connecting said energization winding to said source of power through said space switch and a circuit of said base electrodes of said transistor, a holding circuit for said first relay means comprising said normally open switch for providing a circuit to maintain said relay means energized after being first energized through said unijunctional transistor, a control circuit for said transistor connecting said emitter to said source when said space switch closes comprising a negative coefficient resistor and a condenser voltage charging circuit for providing a predetermined voltage at said emitter after a selected energization time, said negative coefficient resistor providing for a change in the charging circuit as the temperature changes to maintain the time delay in the energization of said transistor at a predetermined amount regardless of the effect of the ambient temperature on said transistor, and means associated with said timing circuit for preventing a reenergization of said timing circuit after said circuit is deenergized until a predetermined time has elapsed.

References Cited in the file of this patent
UNITED STATES PATENTS
3,054,271    McGrath _____ Sept. 18, 1962